US008543764B2

(12) United States Patent
Jevans et al.

(10) Patent No.: US 8,543,764 B2
(45) Date of Patent: *Sep. 24, 2013

(54) STORAGE DEVICE WITH ACCESSIBLE PARTITIONS (75) Inventors: David Alexander Jevans, Los Altos, CA (US); Gil Spencer, Redwood Estates, CA (US)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,301

(22) Filed: Sep. 10, 2012

(65) Prior Publication Data

US 2013/0061315 A1    Mar. 7, 2013

Related U.S. Application Data (63) Continuation of application No. 11/644,089, filed on Dec. 21, 2006, now Pat. No. 8,266,378.

(60) Provisional application No. 60/752,311, filed on Dec. 22, 2005.

(51) Int. Cl.
G06F 12/14    (2006.01)

(52) U.S. Cl.
USPC .... 711/115; 711/164; 711/166; 711/E12.091; 711/E12.094

(58) Field of Classification Search
None
See application file for complete search history.

(56) References Cited

U.S. PATENT DOCUMENTS

| 4,578,530 | A  | 3/1986  | Zeidler        |
| 5,010,571 | A  | 4/1991  | Katznelson     |
| 5,265,159 | A  | 11/1993 | Kung           |
| 5,341,339 | A  | 8/1994  | Wells          |
| 5,404,485 | A  | 4/1995  | Ban            |
| 5,479,638 | A  | 12/1995 | Assar et al.   |
| 5,857,021 | A  | 1/1999  | Kataoka et al. |
| 5,937,425 | A  | 8/1999  | Ban            |
| 6,032,227 | A  | 2/2000  | Shaheen et al. |
| 6,092,196 | A  | 7/2000  | Reiche         |
| 6,118,874 | A  | 9/2000  | Okamoto et al. |
| 6,223,284 | B1 | 4/2001  | Novoa et al.   |
| 6,292,899 | B1 | 9/2001  | McBride        |
| 6,731,536 | B1 | 5/2004  | McClain        |
| 6,763,468 | B2 | 7/2004  | Gupta et al.   |

(Continued)

FOREIGN PATENT DOCUMENTS

WO    WO 02/47081 A2    6/2002

OTHER PUBLICATIONS

Denning, Dorothy E. et al. "A Taxonomy for Key Escrow Encryption Systems," Communications of the ACM, vol. 39, No. 3, pp. 34-40 (Mar. 1996).

(Continued)

*Primary Examiner* — Reginald Bragdon
*Assistant Examiner* — Eric Loonan
(74) *Attorney, Agent, or Firm* — Kenneth E Levitt; Dorsey & Whitney LLP (57) ABSTRACT

A detachable storage device can comprise a memory, circuitry, and a user interface. The memory may comprise a storage partition. The circuitry may be configured to authorize access to the storage partition to a digital device when the detachable storage device is coupled to the digital device based, at least in part, on a user code. The user interface may be configured to receive the user code while the detachable storage device is within a detached state and provide the user code to the circuitry to allow access to the storage partition.

24 Claims, 7 Drawing Sheets

(56) References Cited

U.S. PATENT DOCUMENTS

| | | |
|---|---|---|
| 6,776,332 B2 | 8/2004 | Allen et al. |
| 6,791,877 B2 | 9/2004 | Miura et al. |
| 6,834,795 B1 | 12/2004 | Rasmussen et al. |
| 6,920,527 B2 | 7/2005 | Cloutier et al. |
| 6,961,852 B2 | 11/2005 | Craft |
| 6,987,927 B1 | 1/2006 | Battaglia et al. |
| 6,993,661 B1 | 1/2006 | Garfinkel |
| 7,266,699 B2 | 9/2007 | Newman et al. |
| 7,272,723 B1 | 9/2007 | Abbott et al. |
| 7,275,139 B1 | 9/2007 | Tormasov et al. |
| 7,278,025 B2 | 10/2007 | Saito et al. |
| 7,360,091 B2 | 4/2008 | Aikawa et al. |
| 7,412,420 B2 | 8/2008 | Holdsworth |
| 7,475,425 B2 | 1/2009 | Bantz et al. |
| 7,478,248 B2 | 1/2009 | Ziv et al. |
| 7,511,233 B2 | 3/2009 | Pocrass |
| 7,631,191 B2 | 12/2009 | Glazer et al. |
| 7,685,425 B1 | 3/2010 | Wright et al. |
| 7,698,442 B1 | 4/2010 | Krishnamurthy et al. |
| 7,757,088 B2 | 7/2010 | Abdulhayoglu |
| 8,015,606 B1 | 9/2011 | Jevans et al. |
| 2001/0045451 A1 | 11/2001 | Tan et al. |
| 2002/0029215 A1 | 3/2002 | Whitmyer, Jr. |
| 2002/0046342 A1 | 4/2002 | Elteto et al. |
| 2003/0005336 A1 | 1/2003 | Poo et al. |
| 2003/0041253 A1 | 2/2003 | Matsui et al. |
| 2003/0149670 A1 | 8/2003 | Cronce |
| 2003/0149854 A1 | 8/2003 | Yoshino et al. |
| 2003/0182584 A1 | 9/2003 | Banes |
| 2003/0204735 A1 | 10/2003 | Schnitzmeier |
| 2003/0204754 A1 | 10/2003 | Cromer et al. |
| 2003/0215090 A1 | 11/2003 | Saito et al. |
| 2004/0059925 A1 | 3/2004 | Benhammou et al. |
| 2004/0073797 A1 | 4/2004 | Fascenda |
| 2004/0103288 A1 | 5/2004 | Ziv et al. |
| 2004/0103325 A1 | 5/2004 | Priebatsch |
| 2004/0123113 A1 | 6/2004 | Mathiassen et al. |
| 2004/0146015 A1 | 7/2004 | Cross et al. |
| 2004/0148333 A1 | 7/2004 | Manion et al. |
| 2004/0177258 A1 | 9/2004 | Ong |
| 2004/0188710 A1 | 9/2004 | Koren et al. |
| 2005/0015540 A1 | 1/2005 | Tsai et al. |
| 2005/0020315 A1 | 1/2005 | Robertson |
| 2005/0044377 A1 | 2/2005 | Huang |
| 2005/0055519 A1 | 3/2005 | Stuart et al. |
| 2005/0182973 A1 | 8/2005 | Funahashi et al. |
| 2006/0016875 A1 | 1/2006 | Bonalle et al. |
| 2006/0021059 A1 | 1/2006 | Brown et al. |
| 2006/0041932 A1 | 2/2006 | Cromer et al. |
| 2006/0047717 A1 | 3/2006 | Pereira |
| 2006/0069840 A1 | 3/2006 | Corbett et al. |
| 2006/0095688 A1 | 5/2006 | Kawamura et al. |
| 2006/0117393 A1 | 6/2006 | Merry et al. |
| 2006/0129830 A1 | 6/2006 | Haller et al. |
| 2006/0143476 A1 | 6/2006 | McGovern |
| 2006/0179309 A1 | 8/2006 | Cross et al. |
| 2006/0208066 A1 | 9/2006 | Finn et al. |
| 2006/0224742 A1 | 10/2006 | Shahbazi |
| 2006/0236363 A1 | 10/2006 | Heard et al. |
| 2007/0016743 A1 | 1/2007 | Jevans |
| 2007/0016756 A1 | 1/2007 | Hsieh et al. |
| 2007/0028033 A1 | 2/2007 | Hsieh et al. |
| 2007/0033330 A1 | 2/2007 | Sinclair et al. |
| 2007/0038802 A1 | 2/2007 | Tsai et al. |
| 2007/0056043 A1 | 3/2007 | Onyon et al. |
| 2007/0067620 A1 | 3/2007 | Jevans |
| 2007/0101434 A1 | 5/2007 | Jevans |
| 2007/0118898 A1 | 5/2007 | Morgan et al. |
| 2007/0143530 A1 | 6/2007 | Rudelic et al. |
| 2007/0143532 A1 | 6/2007 | Gorobets et al. |
| 2007/0180509 A1 | 8/2007 | Swartz et al. |
| 2007/0250919 A1 | 10/2007 | Shull et al. |
| 2007/0266421 A1 | 11/2007 | Vaidya et al. |
| 2007/0300031 A1 | 12/2007 | Jevans et al. |
| 2007/0300052 A1 | 12/2007 | Jevans |
| 2008/0005561 A1 | 1/2008 | Brown et al. |
| 2008/0052461 A1 | 2/2008 | Kavian |
| 2009/0222117 A1 | 9/2009 | Kaplan et al. |

OTHER PUBLICATIONS

Tal, Arie. "Two Technologies Compared: NOR v. NAND", White Paper, 01-SR-012-04-8L, Rev. 1.1, Jul. 2003, pp. 1-14.

National Institute of Standards and Technology. "Federal Information Processing Standards Publication 197." Nov. 2001.

Kingston. "Kingston Data Traveler Elite: Advanced Security and High Performance." Oct. 2004. http://www.kingstom.com/digitalmedia/dt_elite.wp.pdf.

Army Regulation 380-19. "Information Systems Security." Feb. 27, 1998. Department of the Army. Appendix F. pp. 28-30.

Sedaghat et al. "A Dynamic Web Agent for Verifying the Security and Integrity of a Web Site's Contents," IEEE, Aug. 2002.

Gutmann, Peter. "Secure Deletion of Data from Magnetic and Solid-State Memory." USENIX. Sixth USENIX Security Symposium Proceedings, San Jose, California, Jul. 1996. http://www.cs.auckland.ac.nz/~pgut001/pubs/secure_del.html.

Fischer, Viktor et al. "True Random Number Generator Embedded in Reconfigurable Hardware." Springer-Verlag. Lecture Notes in Computer Science. vol. 2523, pp. 415-430. 2003.

STORAGE DEVICE WITH ACCESSIBLE PARTITIONS

CROSS-REFERENCE TO RELATED APPLICATIONS

This application is a continuation of U.S. patent application Ser. No. 11/644,089, filed Dec. 21, 2006, now issued as U.S. Pat. No. 8,266,378, which claims benefit to U.S. provisional patent application Ser. No. 60/752,311, filed Dec. 22, 2005, entitled "USB Device with Multiple Secure Partitions and Physical Password Entry," each of which is incorporated by reference herein.

BACKGROUND

1. Field of the Invention

The present invention relates generally to data storage, and more particularly to data storage devices with accessible storage partitions.

2. Background Art

As data processing becomes ubiquitous, users are increasingly demanding that data be both mobile and secure. Although networks, such as the Internet, can transmit data from one computer to another, users often must identify and transmit the data they need to the proper destination. Unfortunately, the data may fail to be transmitted due to firewalls, proxies, spam blockers, size limitations, technical error, or human error. Further, it is not always practical for users to guess what data is needed at a future time and the location of the need. The data is also often routed through unsecure servers or network devices which can intercept the data and further compromise security.

As a result of these problems, users often load data on USB memory devices (e.g., a memory stick) and carry data with them. Unfortunately, USB memory devices can be stolen and accessed by thieves. Some USB memory devices have passwords which must be entered on the host computer before accessing the stored data. However, the password can be cracked (e.g., a brute force attack) and the data accessed.

Some USB memory devices lock the stored data after a predetermined number of password attempts have been made to prevent data theft. Unfortunately, the lock is often easy to reset. Further, the attacker can make a copy of the data stored in the USB memory device, enter the predetermined number of password attempts, delete the data, recopy the data, and enter new password attempts. This process can be repeated until successful thereby inevitably accessing the data.

Another problem associated with USB memory devices is that once a user has access, the user has access to all of the data on the USB memory device. As a result, different USB memory devices containing different information must be carefully tracked by a company to control the access to information. For example, it is not uncommon for businesses to deny access of accounting information to employees who are not associated with the accounting department. Similarly, human resource information is often denied to employees who are not associated with the human resources department. Current businesses often do not store accounting information and human resource information on a single USB memory device because any employee that has access to data on the single USB memory device would have access to both the accounting information and the human resource information.

SUMMARY OF THE INVENTION

A detachable storage device can comprise a memory, circuitry, and a user interface. The memory may comprise a storage partition. The circuitry may be configured to authorize access to the storage partition to a digital device when the detachable storage device is coupled to the digital device based, at least in part, on a user code. The user interface may be configured to receive the user code while the detachable storage device is within a detached state and provide the user code to the circuitry to allow access to the storage partition.

The circuitry may be further configured to deny access to the digital device to an other storage partition based on the user code. The circuitry may also be further configured to authorize access to data within the storage partition, based, at least in part, on the user code.

The detachable storage device can be a USB storage device or a secure storage device. The detachable storage device can further comprise a communications interface configured to send a signal to the digital device that the storage partition is authorized for access.

Further, the circuitry may be further configured to alert a user that access to the storage partition is allowed based on the authorization. Circuitry configured to authorize access to the storage partition may comprise the circuitry configured to decrypt a security code or decryption key to access the storage partition or data stored in the storage partition based on the user code.

The circuitry may also be configured to send a signal to the digital device to recognize and mount the storage partition. Further, the detachable storage device can comprise a power system to supply power to the circuitry.

An exemplary method to authorize access to a storage partition within a detachable storage device can comprise receiving a user code with the detachable storage device to allow access to the storage partition within the detachable storage device when the detachable storage device is in a detached state, authorizing access to the storage partition with a digital device when the detachable storage device is coupled to the digital device based, at least in part, on the user code, and providing access to the storage partition based on the authorization.

An exemplary computer readable medium may have embodied thereon a program. The program is executable by a processor for performing a method to authorize access to a storage partition within a detachable storage device. The method can comprise receiving a user code with the detachable storage device to allow access to the storage partition within the detachable storage device when the detachable storage device is in a detached state, authorizing access to the storage partition with a digital device when the detachable storage device is coupled to the digital device based, at least in part, on the user code, and providing access to the storage partition based on the authorization.

DETAILED DESCRIPTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A secure storage device, such as portable memory device, can require the user to input a user code offline to unlock the stored data within the secure storage device. A user code is manually input the secure storage device and comprises a password, code, or a user identifier. The user code can be a unique set of characters that may contain a variety of characters (alphanumeric, numeric, symbols, or special characters). In other embodiments, the user code can comprise a user identifier such as a fingerprint, voice identifier, or retina scan. Entering the user code offline comprises the user entering the user code into the secure storage device before the secure storage device is operationally coupled with a digital device. To be operationally coupled, the secure storage device is coupled with a digital device and is enabled to receive commands and/or data from the digital device. A digital device is any device with a processor capable of sending or receiving data (e.g., a computer, laptop, personal digital assistant, and cell phone).

In one example, the user enters the user code into the secure storage device to authorize access to the stored data. The user can subsequently plug the secure storage device into the digital device. The digital device can then proceed to mount an unlocked data storage partition and access the stored data. If the user does not enter the user code or enters an incorrect user code and proceeds to plug the secure storage device into the digital device, the digital device may not be able to access the stored data.

By entering the user code directly into the secure storage device rather than through a digital device, neither the stored data nor the device driver may be accessed. In some embodiments, the digital device does not recognize the secure storage device and the media within the secure storage device cannot be mounted until the correct user code is entered. Consequently, the stored data cannot be copied from the secure storage device without a user code. As a result, the stored data cannot be copied from the secure storage device onto another media to attack the user code or apply new software attacks to retrieve the stored data. The danger of theft of the secure storage device is reduced as the thief may not be able to access the stored data.

In exemplary embodiments, the secure storage device comprises a detachable storage device. A detachable storage device is any storage device (e.g., USB storage device) that may be coupled to a digital device. Encrypted storage partitions may be contained within the detachable storage device. In some embodiments, the data contained within the encrypted storage partition may be further encrypted.

In one example, the user enters a user code directly into the detachable storage device to authorize access to a storage partition. The user may then attach (i.e., couple) the detachable storage device with the digital device. The digital device may then recognize and load the appropriate device driver for the detachable storage device. The user may then access the storage partition with the digital device. The user may subsequently store or retrieve data within the storage partition.

Figure 1:
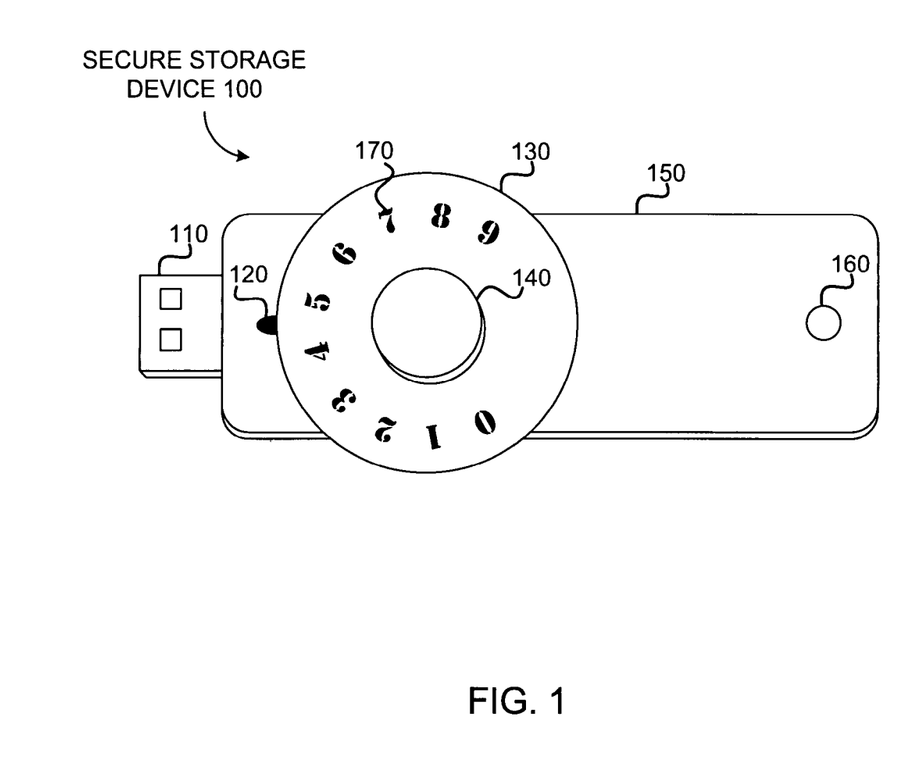
FIG. 1 depicts a secure storage device, in accordance with one embodiment of the present invention.

Referring to FIG. 1, a secure storage device 100 in accordance with one embodiment of the present invention is shown. The secure storage device 100 comprises a USB connector 110 coupled to a secure storage device housing 150. A user can turn a user input knob 140 to turn a radial dial input 130 to enter the user code into the secure storage device 100. A code indicator 120 marks a code character 170 to be entered into the secure storage device 100 as a part of the user code. An authorization indicator 160 indicates when the user code has been accepted and access to the stored data on the secure storage device 100 has been authorized.

In one example, a user carries stored data within the secure storage device 100. Prior to plugging the secure storage device 100 into a digital device's USB port, the user enters the user code into the secure storage device 100 by turning the user input knob 140 to turn the radial dial input 130 so that one or more code characters 170 are lined up with the code indicator 120. After the correct user code has been entered, the authorization indicator 160 can illuminate or otherwise indicate that access to the stored data has been authorized. The user may then proceed to plug the secure storage device 100 into the digital device to access the stored data.

If the user fails to enter the correct user code but plugs the secure storage device 100 into the digital device, the digital device may fail to recognize the secure storage device 100, fail to mount the digital media within the secure storage device 100, fail to execute the device driver for the secure storage device 100, and/or be unable to access the stored data.

In various embodiments, the user can turn the turn the user input knob 140 to align the code character 170 on the radial dial input 130 with the code indicator 120 and the enter the code character 170 into the secure storage device 100. In one example, the user depresses the user input knob 140 to enter the code character 170 aligned with the code indicator 120. In another example, the user depresses a button (not depicted) to enter the code character 170 into the user code. In some embodiments, there is a switch or button that locks the secure storage device 100 to prevent the user from inputting a user code or code character 170 unintentionally (e.g., while the user is carrying the secure storage device 100 in a pocket).

The USB connector 110 can be coupled to any USB port of the digital device. Although a USB connector 110 is depicted in FIG. 1, the secure storage device 100 is not limited to a USB type connector. In some embodiments, the secure storage device 100 can be coupled to the digital device through a firewire connection, Ethernet connection, serial connection, parallel connection, SCSI connection, Host Bus Adapter, flash card interface, or ATA connection. Further, the secure storage device 100 can operationally couple wirelessly to the digital device over 802.11 a/b/g/n standards, Bluetooth, or wireless USB. It is apparent to those skilled in the art that the secure storage device 100 can be operationally coupled to the digital device in many ways.

In various embodiments, the secure storage device 100 can be physically or wirelessly coupled to the digital device but the connection is not operational until the user code is entered into the secure storage device 100. In one example, the secure storage device 100 comprises the USB connector 110 coupled to the digital device. Until the user code is entered into the secure storage device 100, the digital device may not recognize the secure storage device 100, load the device driver for the secure storage device 100, or mount the media contained within the secure storage device 100.

The storage device housing 150 may contain any type of data storage medium or storage system as well as a power source. The data storage medium (not depicted) may comprise flash memory (e.g., NAND flash or NOR flash memory), a hard drive, storage card, ram disk, or any other kind of data storage. A storage system (further described in FIG. 6) can comprise the data storage medium. The power source (not depicted) can be a rechargeable battery, a replaceable battery (e.g., AA), or a capacitor. In some embodiments, the battery or capacitor can be recharged by the digital device through the USB connector 110 (or any connector that couples the secure storage device 100 to the digital device).

Similarly, although the user code input is facilitated by the radial dial input 130, the user input knob 140, and the code indicator 120 in FIG. 1, it is apparent to those skilled in the art that the user code can be input into the secure storage device 100 in many ways. In one example, the secure storage device 100 comprises a keypad with which the user can press keys to enter the user code. In another example, the secure storage device 100 comprises a biometric sensor which can receive the voice, fingerprint, or retina scan of the user as the user code.

The authorization indicator 160 displays an indicator when the user code has been accepted and that access to the stored data is authorized. The authorization indicator 160 can comprise a light emitting diode (LED) that emits a light to indicate that the user code has been accepted. In some embodiments, the authorization indicator 160 can generate a light of a first color to indicate user code acceptance (e.g., green) and a second color to indicate that the user code has been rejected (e.g., red). The authorization indicator 160 may comprise multiple LEDs to indicate user code acceptance, rejection, or lockout of the secure storage device 100 (further discussed in FIG. 5). An authorization lockout may be triggered if one or more incorrect user codes are received. An authorization lockout locks the secure storage device 100 so that the secure storage device 100 will refuse to accept any user codes until reset. In other embodiments, a sound may be generated by the secure storage device 100 to indicate that the user code has been accepted or rejected.

Figure 2:
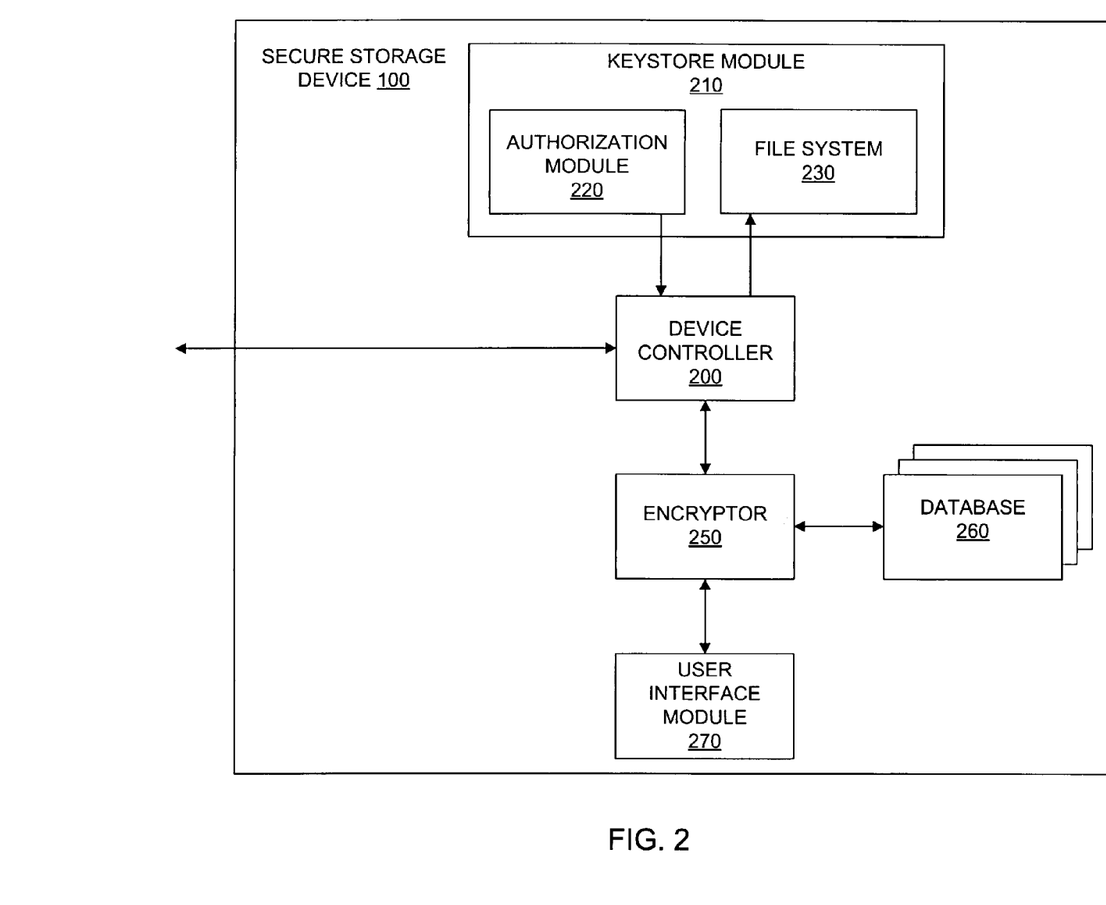
FIG. 2 depicts a block diagram of a secure storage device, in accordance with one embodiment of the present invention.

FIG. 2 is a block diagram of a secure storage device 100, in accordance with one embodiment of the present invention. The secure storage device 100 comprises a device controller 200 coupled to the keystore module 210. The keystore module 210 comprises an authorization module 220 and a file system 230. The device controller 200 is further coupled to an encryptor 250 which is further coupled to database 260 and a user interface module 270.

The device controller 200 can comprise the device driver for the secure storage device 100. The device controller 200 controls the communication with the digital device (not depicted) as well as the operations within the secure storage device 100. In some embodiments, the device controller 200 can control a processor or circuitry within the secure storage device 100.

In various embodiments, the device controller 200 receives an identification query from a digital device requesting the type of device of the secure storage device 100. If authorized, the device controller 200 can respond by transmitting a signal to the digital device identifying the secure storage device 100 and allowing any digital media to be mounted within the operating system of the digital device. If not authorized, the device controller 200 may refuse to respond or reject the digital device's attempts to mount the digital media. 10401 In other embodiments, the device controller 200 receives the identification query from the digital device and identifies the secure storage device 100 as a compact disc (CD). The digital device may then attempt to automatically run an authorization check program from the device controller 200. This feature is similar to automatically playing the first song on an audio CD upon loading of the CD. The authorization check program can determine if access to the stored data is authorized. If access to stored data is not authorized, the authorization check program may terminate or the transmission of data between the digital device and the secure storage device 100 may terminate. Further, the device controller 200 may refuse to allow the digital device access to the database 260 and/or refuse to allow the digital media to be mounted.

The device controller 200 may also control the authorization indicator 160 (FIG. 1) based on an authorization indicator signal from the authorization module 220. In one example, if access to the stored data is authorized, the device controller 200 may send a signal to the authorization indicator 160 to illuminate an LED or generate a sound to indicate that access to the stored data is authorized. The device controller 200 can also generate a signal to the authorization indicator 160 to illuminate an LED or generate a sound to indicate that authorization is denied or that the secure storage device 100 is locked.

The keystore module 210 authorizes access to the stored data within the database 260. The keystore module 210 comprises the authorization module 220 and optionally a file system 230. In some embodiments, the keystore module 210 also comprises one or more authentication passwords to authorize access to the stored data. In other embodiments, the one or more authentication passwords are within the file system 230. An authentication password is a password, code, or key retained in the secure storage device 100 to authenticate the user code.

The authorization module 220 receives the user code or a security code (discussed herein) and determines if the user is authorized to access the stored data. In exemplary embodiments, the authorization module 220 determines if the user is authorized to access the stored data based on the user code (or the security code) and the one or more authentication passwords. In one example, the authorization module decrypts an authentication password with the user code (or security code). If the decrypted authentication password is correct, then the user may be authorized to access the stored data. If the user is authorized to access the stored data, the authorization module 220 may transmit an authorization signal to the device controller 200 to authorize access. If the user is not authorized, the authorization module 220 may refuse to respond to subsequent attempts to access the data (e.g., locking the secure storage device 100).

In some embodiments, the secure storage device 100 does not comprise authentication passwords. As a result, the authorization module 220 can base the authorization determination on the user code. Those skilled in the art will appreciate that there may be many methods in which the authorization module 220 may determine authorization to access the stored data based, at least in part, on the user code or security code.

The file system 230 can maintain a list of one or more authentication passwords and/or the file system of the database 260. In various embodiments, the file system 230 can associate each authentication password with a different storage partition within the digital media. As a result, separate user codes may access different storage partitions within the digital media. In one example, a first user code entered by a user may authorize access to a storage partition with data used at the user's home. A second user code may authorize access to a storage partition with business data. As a result, a single secure storage device 100 may be shared with co-workers or others which may be allowed to access some, but not all, of the stored data retained within the secure storage device 100. In other embodiments, the file system 230 can maintain a list of one or more user codes associated with the different storage partitions within the digital media.

In various embodiments, the secure storage device 100 can comprise one or more storage partitions that do not contain any previously stored data. As a result, multiple employees with different access rights may use the same secure storage device 100 and exchange appropriate data without compromising data security.

In one example, an engineer can store trade secrets in a first storage partition on the same secure storage device 100 that contains confidential accounting information in a second storage partition. The user code that unlocks the first storage partition may not unlock the second storage partition. As a result, engineers with one user code may only access and store data within the first storage partition while accountants with another user code may only access and store data within the second storage partition. A CIO of a company, however, may have access to all user codes or a "master" user code that allows access to all storage partitions on the secure storage device 100.

In some embodiments, the file system 230 maintains the scrambled database file system of the database 260. The database file system is a map of the stored data retained within the database 260. Without the database file system, the digital device may not be able to identify stored data contained within the database 260. By separating the database file system from the database 260, a thief who removes the database 260 from the secure storage device 100 may fail to steal the database file system. Further, the database file system may be scrambled. The authorization module 220 can unscramble the database file system within the file system 230 or the database 260 when access to the stored data is authorized.

The encryptor 250 functions to encrypt or decrypt security codes, stored data within the database 260, or the file system 230. In exemplary embodiments, the stored data within the database 260 is encrypted. If access to stored data is authorized, the encryptor 250 encrypts data transmitted from the digital device prior to storage within the database 260. Further, as stored data is requested from the database 260, the encryptor 250 can decrypt the stored data prior to transmission of the stored data to the digital device. As a result, the stored data within the database 260 may always be encrypted.

The encryptor 250 can also decrypt the security code using the user code prior to authorization. When the security code is decrypted, the security code may be sent to the authorization module 220 where it may be compared to the one or more authentication passwords within the keystore module 210. In some embodiments, the database 260 and the keystore module 210 are retained on separate chips within the secure storage device 100.

The database 260 can comprise one more databases or other data structures of stored data. The database 260 may be contained within a storage system. The storage system is further discussed in FIG. 6.

The user interface module 270 controls the user interface (e.g., the radial dial input 130 in FIG. 1) and receives the user code. In exemplary embodiments, the user interface module 270 receives the user code from the user. In some embodiments, the user interface module 270 sends the user code to the encryptor 250 to decrypt the user code. In other embodiments, the user interface module 270 sends the user code to the encryptor 250 to decrypt a security code. The security code may be used to authorize access to the stored data.

In various embodiments, a "reset" user code may be entered into the secure storage device 100 to erase all other user codes. The "reset" user code may be entered through the user interface module 270, through a program running on the digital device, or a program running on a secure website by a trusted third party (e.g., the secure storage device's manufacturer). In some embodiments, the entry of the "reset" code may erase all data and/or storage partitions within the secure storage device 100. As a result, the entry of the "reset" user code may return the secure storage device 100 to the original condition that the secure storage device 100 left the factory.

The "reset" code can be digitally signed or encrypted. Upon receiving the "reset" code, the secure storage device 100 may decrypt the "reset" code or decrypt an encryption key sent with the "reset" code for authentication. Those skilled in the art will appreciate that there may be many ways to authenticate the "reset" code and/or check to ensure that the sender of the "reset" code is authorized.

Figure 3:
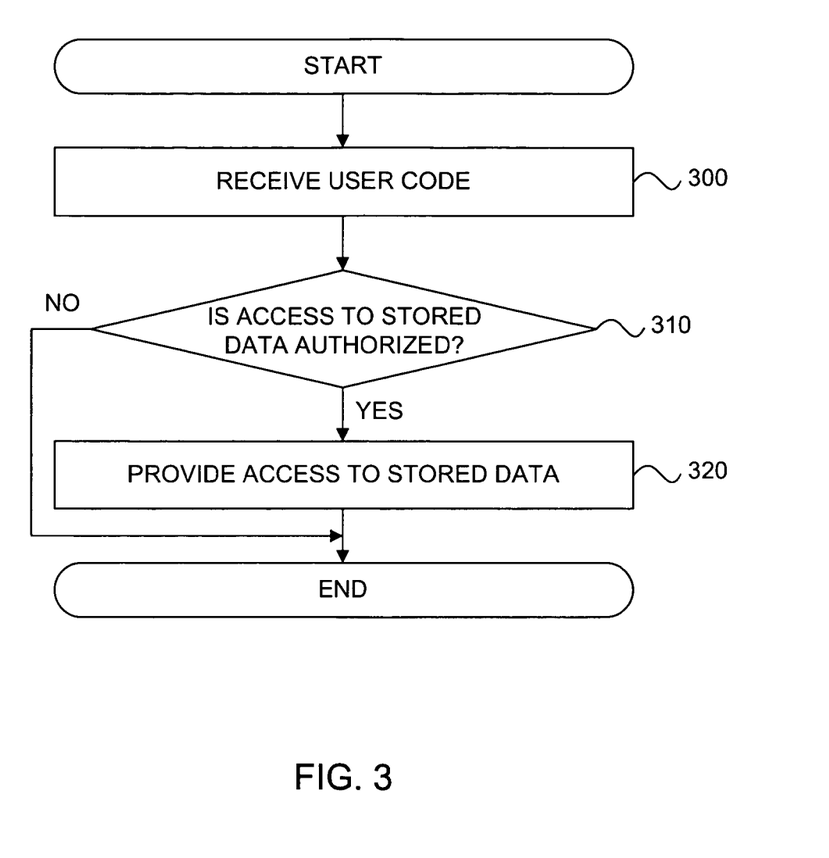
FIG. 3 is a flow chart for the entry of a user code to access stored data, in accordance with one embodiment of the present invention.

FIG. 3 is a flow chart for the entry of a user code to access stored data, in accordance with one embodiment of the present invention. The user interface module 270 (FIG. 2) receives the user code from the user in step 300. The user code may comprise a series of numbers, letters, symbols, or special characters. In other embodiments, the user code comprises a retinal scan, voice identifier, or fingerprint identifier.

In step 310, the authorization module 220 (FIG. 2) determines if access to the stored data is authorized. In one example, the authorization module 220 receives and compares the user code to the one or more authentication passwords within the keystore module 210 (FIG. 2) or the file system 230 (FIG. 2). If the authorization module 220 determines that access to the stored data is authorized, then the authorization module 220 may generate a signal to the device controller 200 (FIG. 2) to allow or provide access to the stored data in step 320. Once access to the stored data is authorized, a digital device (not depicted) may access the data stored within the database 260 of the secure storage device 100.

In various embodiments, the authorization module 220 determines if access to one or more storage partitions contained within the secure storage device 100 is authorized. If the authorization module 220 determines that access to one or more storage partitions is authorized, then the authorization module 220 may generate a signal to the device controller 200 to allow or provide access to the one or more storage partitions.

One or more storage partitions within the secure storage device 100 may be named or otherwise identified by a storage partition identifier. When access to one or more storage partitions is authorized, the secure storage device 100 may indicate which storage partition is authorized. In some embodiments, different sounds are generated for different storage partitions. In an example, the word "accounting" may be emitting by a speaker within the secure storage device 100 when access is authorized to the accounting storage partition.

In other embodiments, a display on the secure storage device 100 may indicate if access to any storage partitions is authorized. In one example, the display may display (or scroll) the words "all storage partitions authorized" when access to all storage partitions within the secure storage device 100 is authorized. The display may indicate or identify which storage partitions are present within the secure storage device 100 as well as which storage partitions are authorized for access. Those skilled in the art will appreciate that the display may display any kind of message to indicate that access to storage partitions and/or data within the secure storage device 100 is or is not authorized.

Figure 4:
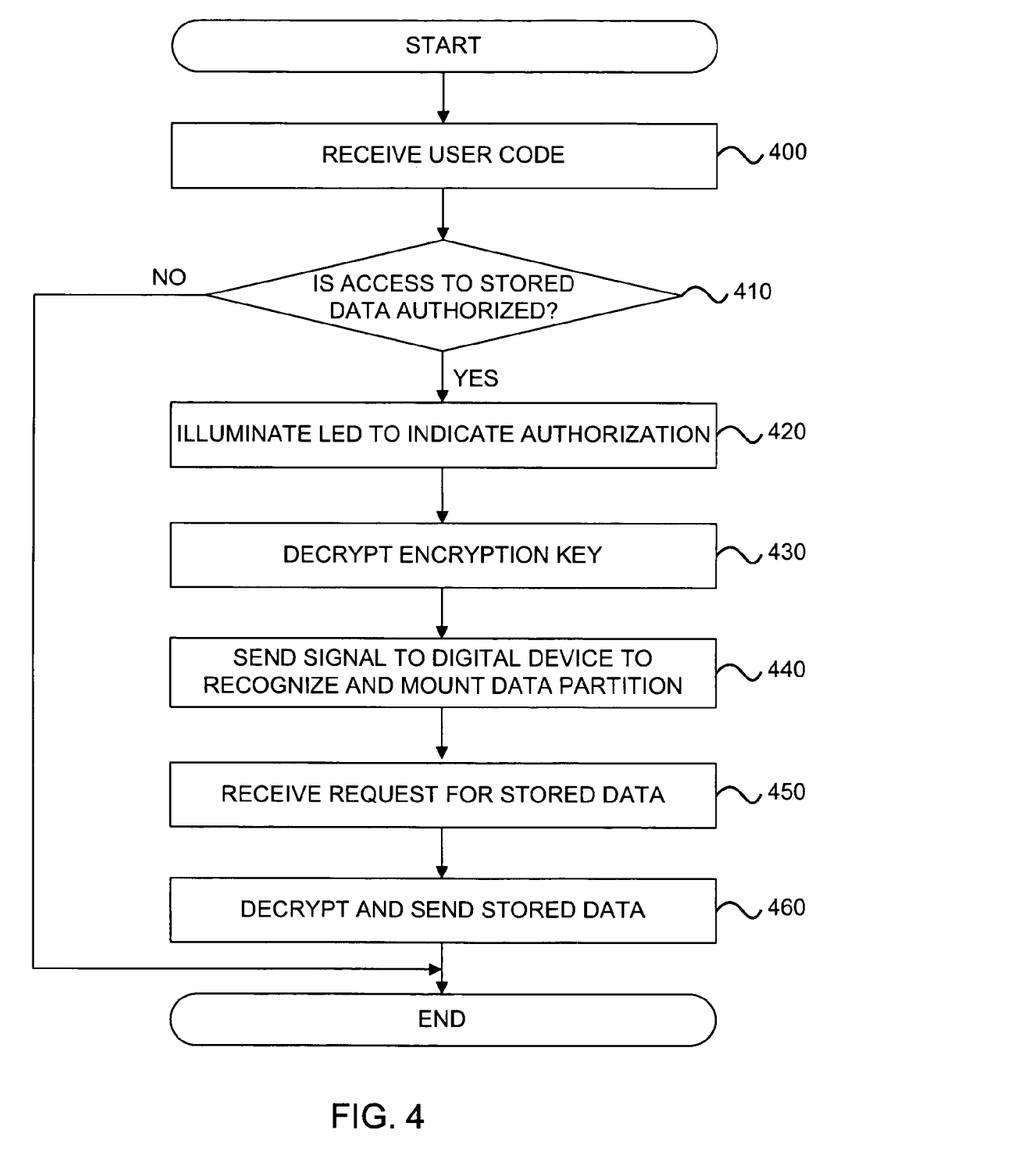
FIG. 4 is another flow chart for the entry of a user code to access stored data, in accordance with one embodiment of the present invention.

FIG. 4 is another flow chart for the entry of a user code to access stored data, in accordance with one embodiment of the present invention. In step 400, the user interface module 270 (FIG. 2) receives the user code from the user. In some embodiments, the user interface module 270 sends the user code to the encryptor 250 (FIG. 2) to decrypt the security code with the user code. The security code can then be transmitted to the authorization module 220 (FIG. 2) to determine if access to the stored data or a storage partition is authorized.

In step 410, the authorization module 220 determines if access to stored data and/or a storage partition is authorized. In one example, the authorization module 220 receives and processes the security code. The authorization module 220 can base the authorization determination, at least in part, upon the security code. In other embodiments, the authorization module 220 can base the authorization determination, at least in part, upon the security code and an authentication password. In an example, the authorization module 220 can retrieve the authentication password from the keystore module 210 (FIG. 2), the file system 230 (FIG. 2), or the database 260 (FIG. 2). In some embodiments, the authentication password is stored with one or more other authentication passwords. The authentication password may be stored in a hash table and/or encrypted. If the authorization module 220 determines that access to the stored data is authorized, then the device controller 200 (FIG. 2) can send a signal to illuminate the LED or to a display to indicate authorization in step 420. If access to the stored data is not authorized, FIG. 4 ends. Lockout and resetting the secure storage device 100 is further discussed in FIG. 5.

In step 430, in response to authorization to access the stored data, the encryptor 250 decrypts the encryption key. The encryption key can be used to encrypt data received from the digital device prior to storing within the database 260. Similarly, the encryption key can be used to decrypt stored data received from the database 260 to send to the digital device. The process of encryption/decryption can occur during saving and transmitting data with no appreciable loss of speed. In some embodiments, an encryption key and a separate decryption key are decrypted by the encryptor 250.

Upon authorization, the device controller 200 can descramble the database file system contained within the file system 230. As a result, the data storage partition containing the database 260 may be mounted once the secure storage device 100 is operationally coupled to the digital device. 10641 In exemplary embodiments, after authorization is indicated, the secure storage device 100 (FIG. 2) can be operationally coupled with a digital device. In one example, the user inputs the correct user code and receives an indication that access to the stored data is authorized. The user can then couple the secure storage device 100 to the digital device, which subsequently sends an identification query to the secure storage device 100.

In step 440, optionally in response to an identification query from the digital device, the device controller 200 sends a signal to the digital device to identify the secure storage device 100 and mount the data storage partition. In step 450, the device controller 200 receives a request for stored data from the digital device. The requested stored data is unencrypted by the encryptor 250 with the proper encryption key prior to sending the requested stored data to the digital device in step 460.

In exemplary embodiments, the access to the stored data is authorized only for a predetermined period of time before re-authorization is required. In one example, access to the stored data within the secure storage device 100 remains authorized for two minutes unless the secure storage device 100 is operationally coupled to a digital device during that time. In an example, a display on the secure storage device 100 may indicate the time remaining before the authorization expires.

In other embodiments, re-authorization is required after a predetermined period of inactivity. In one example, access to stored data is authorized and the secure storage device 100 is subsequently operationally coupled to a digital device via a USB connector. If data is not stored on the secure storage device 100 or retrieved from the secure storage device 100 within 30 minutes, then access to stored data may be denied until re-authorization.

In some embodiments, re-authorization is required after the secure storage device 100 is decoupled from the digital device or after the user presses a switch or button to terminate the session. In one example, the user unplugs the secure storage device 100 from a USB port on the digital device which terminates the session and access to the stored data requires re-authorization. It will be apparent to those skilled in the art that there may be many ways to terminate a session and require re-authorization.

In exemplary embodiments, the user can change or otherwise customize the user code. In one example, the user code comprises numbers, letters, symbols, or special characters. The user may enter a customize code to change the user code. In an example, the customize code can be sent from the manufacturer with the secure storage device 100. In another example, the user downloads the customize code from a website. The customize code may be unique to each secure storage device. Further, the customize code may change on every code change or after a predetermined time interval.

The user code can also comprise a fingerprint, voice identifier, or retina scan. In various embodiments, the customize code can be entered into the secure storage device 100 through buttons or switches. The fingerprint, voice identifier, or retina scan can then be entered. The entered fingerprint, voice identifier, or retina scan can then be used as the user code.

Figure 5:
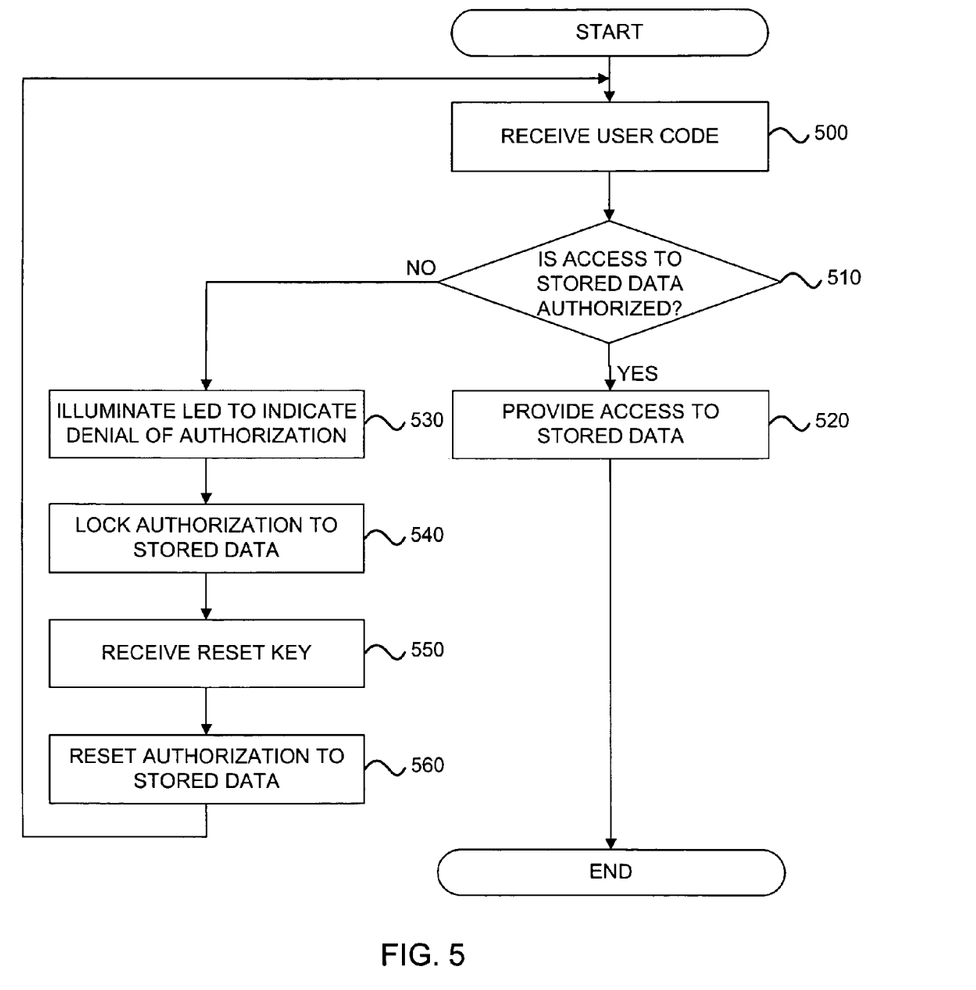
FIG. 5 is a flow chart for locking and resetting the secure storage device, in accordance with one embodiment of the present invention.

FIG. 5 is a flow chart for locking and resetting the secure storage device 100, in accordance with one embodiment of the present invention. In step 500, the device controller 200 (FIG. 2) receives the user code from the user to access to the stored data within the secure storage device 100 (FIG. 2).

In step 510, the authorization module 220 (FIG. 2) authenticates the user code to determine if access to the stored data is authorized. If access to the stored data is authorized, then the device controller 200 provides an operationally coupled digital device access to the stored data in step 520. If access to the stored data is not authorized and the user code is incorrect, the device controller 200 transmits a signal to illuminate an LED to indicate that denial of authorization in step 530. In one example, the LED is red which indicates the denial of authorization. In other embodiments, a sound is generated by the secure storage device 100 or light and one or more sounds are generated by the secure storage device 100 to indicate denial of authorization.

In step 540, the device controller 200 locks authorization to the stored data. This "lock out" requires that the secure storage device 100 be reset before access to the stored data is authorized. In some embodiments, a predetermined number of attempts to authorize access occur before the secure storage device 100 is locked out. The device controller 200 can transmit a signal to the authorization indicator 160 (FIG. 1) to indicate that the secure storage device 100 is locked.

In exemplary embodiments, the user visits a product website, identifies the secure storage device 100, and requests a reset key. The reset key is a code that resets the secure storage device 100 so that the user can seek access to the stored data. In one example, the user creates an account on a website and must answer specific questions to authenticate the user's identity prior to requesting the reset key. The reset key can change over an interval of time, upon every use, or upon each request for the reset key. In other embodiments, the user receives the reset key upon purchase of the secure storage device 100.

In step 550, the device controller 200 receives the reset key from the user. The reset key can be used to decrypt a reset code prior to resetting the secure storage device 100. Further, the authorization module 220 may determine that the reset key and/or the reset code are authentic prior to resetting.

In step 560, the device controller 200 resets the secure storage device 100. In some embodiments, the device controller 200 transmits a signal to the authorization indicator 160 to indicate that the secure storage device 100 is no longer locked. In some embodiments, the device controller 200 transmits an unlock signal to the authorization module to unlock the secure storage device 100 so that the secure storage device 100 can again receive a user code to access the stored data in step 500.

Figure 6:
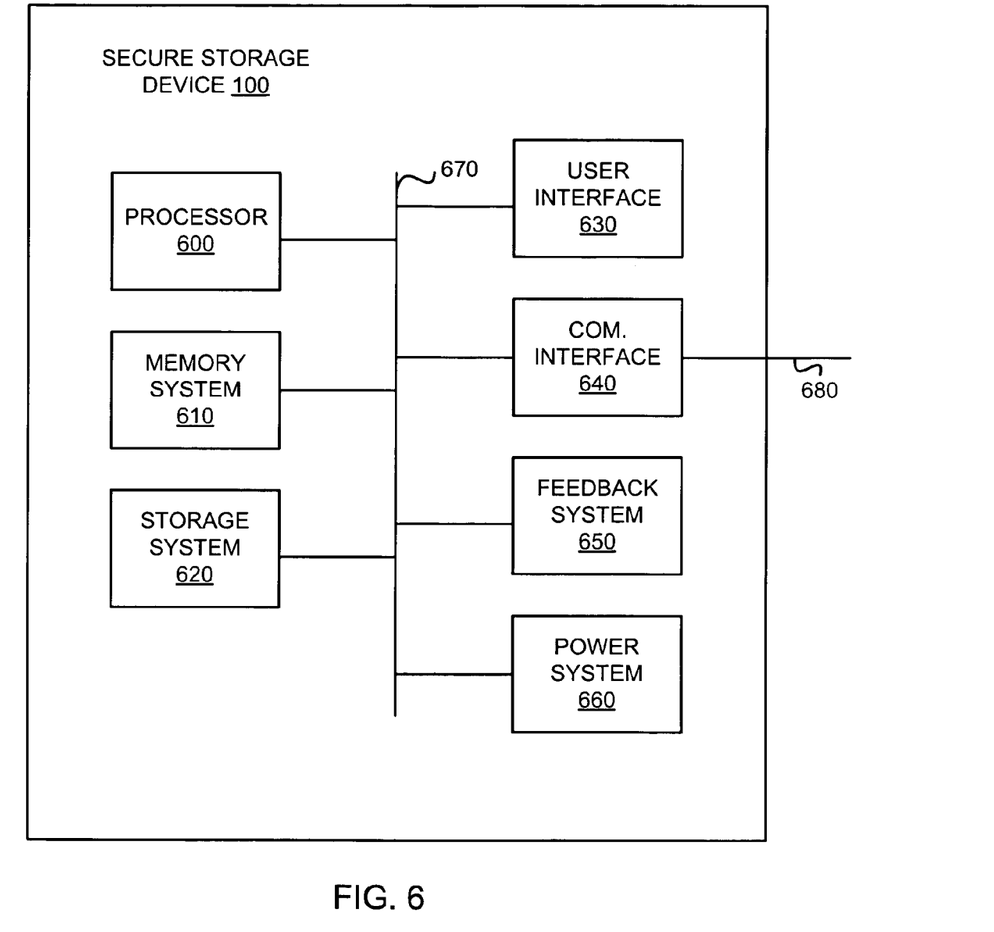
FIG. 6 depicts a detachable storage device, in accordance with one embodiment of the present invention.

FIG. 6 is a block diagram of the secure storage device 100 in an exemplary implementation of the invention. The secure storage device 100 comprises a processor 600, an optional memory system 610, a storage system 620, a user interface 630, a communication interface 640, feedback system 650, and a power system 660 which are all coupled to a system bus 670. The processor 600 is configured to execute executable instructions. In some embodiments, the processor 600 comprises circuitry or any processor capable of processing the executable instructions.

The memory of the secure storage device 100 can comprise a memory system 610 and a storage system 620. The memory system 610 is any memory configured to store data. Some examples of the memory system 610 are storage devices, such as RAM or ROM.

The storage system 620 is any storage configured to retrieve and store data. Some examples of the storage system 620 are flash drives, hard drives, storage card, optical drives, and/or magnetic tape. The storage system 620 can comprise a database 260 (FIG. 2) or other data structure configured to hold and organize data. In some embodiments, the secure storage device 100 includes the memory system 610 in the form of RAM and the storage system 620 in the form of flash data.

The user interface 630 is any device that can receive a user code. The user interface 630 can be, but is not limited to, a radial dial, keypad, or biosensor. 10811 The communication interface 640 can be coupled to any digital device via the link 680. As discussed in FIG. 1, the communication interface 640 may support communication over a USB connection, a firewire connection, an Ethernet connection, a serial connection, a parallel connection, Host Bus Adapter, flash card interface or an ATA connection. The communication interface 640 may also support wireless communication (e.g., 802.11 a/b/g/n or wireless USB). It will be apparent to those skilled in the art that the communication interface 640 can support many wired and wireless standards.

The feedback system 650 is any indicator that signals the user that access to the stored data within the secure storage device 100 is authorized. In some examples, the feedback system 650 can be an LED light or sound. The feedback system 650 may also indicate that access to the stored data is not authorized or that the secure storage device 100 is locked.

The optional power system 660 is any system that can provide power to the secure storage device. The power system 660 can supply power to the secure storage device 100 to receive the user code and authorize access to the stored data. In one example, the power system 660 comprises a rechargeable battery, a replaceable battery, or a capacitor. The batteries or capacitor may be recharged with a power recharger or from power received from the digital device. In some embodiments, the power system 660 is optional, and the user code can be passively received. Once the secure storage device 100 is coupled to the digital device, power can be received from the digital device and the authorization process completed.

In some embodiments, the power system 660 supplies power to the processor 600 when the secure storage device 100 is not coupled to a digital device. In one example, the power system 660 supplies power to the processor 600 during the process of receiving the user code and authorization. Once the secure storage device 100 is coupled to the digital device, the digital device may supply power to the secure storage device.

Figure 7:
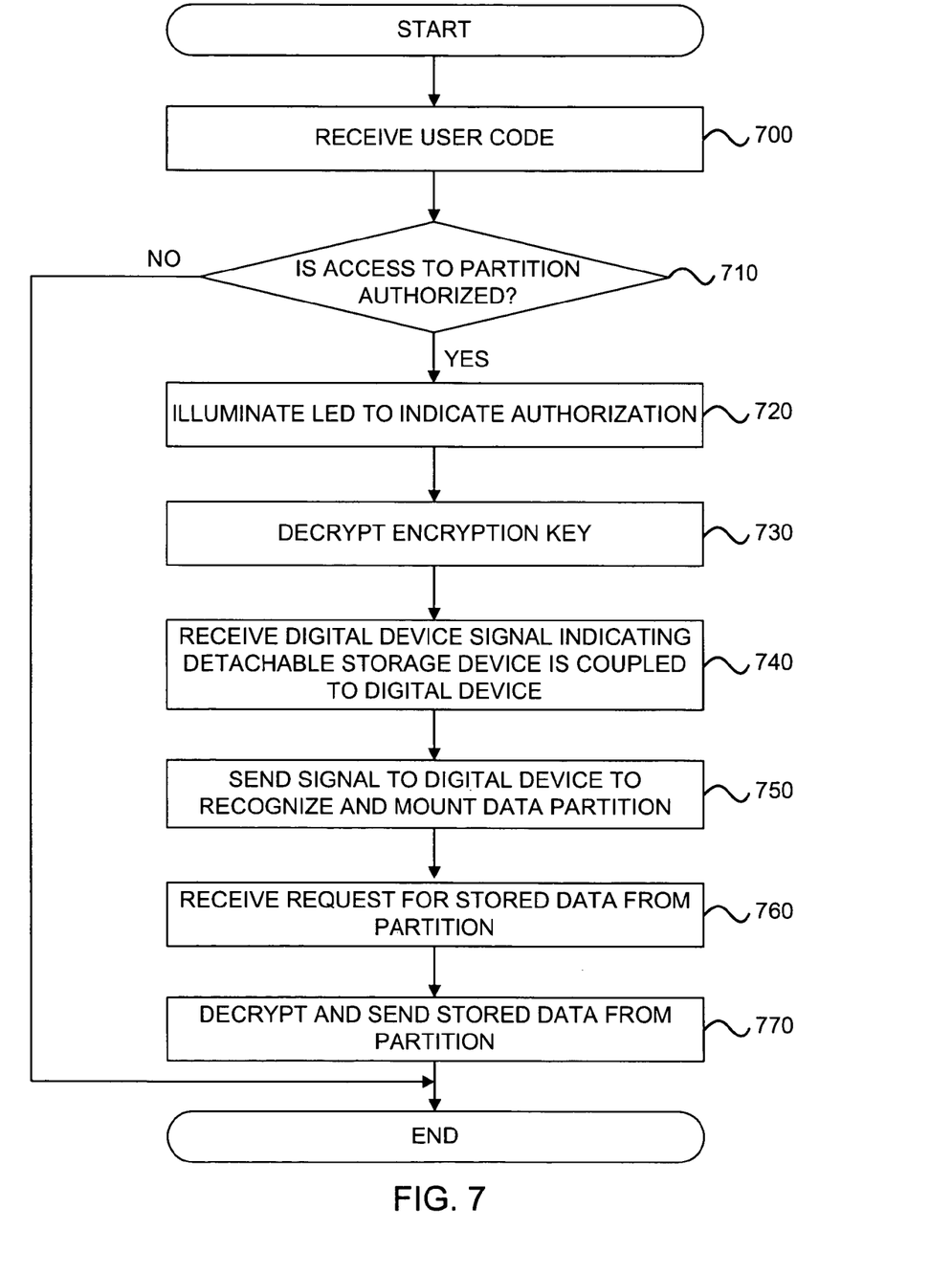
FIG. 7 is a flow chart for accessing a storage partition on a detachable storage device.

FIG. 7 is a flow chart for accessing a storage partition on a detachable storage device. In this example, the detachable storage device comprises the same components of the secure storage device 100 depicted in FIG. 2. The storage partition may be contained within the database 260. In step 700, the user interface module 270 within the detachable storage device receives a user code. The user interface module 270 sends the user code to the encryptor 250 to decrypt the security code with the user code. The security code can then be transmitted to the authorization module 220 to determine if access to the storage partition is authorized.

In step 710, the authorization module 220 determines if access to the storage partition is authorized. In one example, the authorization module 220 receives and processes the security code. The authorization module 220 can base the authorization determination, at least in part, upon the security code. In other embodiments, the authorization module 220 can base the authorization determination, at least in part, upon the security code and an authentication password.

If the authorization module 220 determines that access to the storage partition is authorized in step 710, then the device controller 200 can send a signal to illuminate the LED or to a display to indicate authorization in step 720. If access to the storage partition is not authorized, FIG. 7 ends.

In step 730, in response to authorization to access the storage partition, the encryptor 250 decrypts the encryption key. The encryption key can be used to encrypt data received from the digital device prior to storing within the storage partition. Similarly, the encryption key can be used to decrypt stored data received from the storage partition to send to the digital device.

After authorization to the storage partition is granted, the user may couple the detachable storage device to the digital device. In step 740, the device controller 200 receives a digital device signal indicating the detachable storage device is coupled to the digital device. In one example, the digital device sends a query to identify the detachable storage device and load the appropriate device driver.

Upon authorization, the device controller 200 can descramble the database file system contained within the file system 230. As a result, the storage partition may be mounted by the digital device in step 750. If authorization to the storage partition is not granted, then the digital device may not be able to identify the detachable storage device, unable to access the correct device controller to access the detachable storage device, and/or be otherwise unable to mount the storage partition.

In step 760, the device controller 200 receives a request for stored data within the storage partition from the digital device. The requested stored data is unencrypted by the encryptor 250 with the proper encryption key prior to sending the requested stored data from the storage partition to the digital device in step 477.

The above-described functions can be comprised of executable instructions that are stored on storage media. The executable instructions can be retrieved and executed by the processor 600. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

What is claimed is:

1. A storage device comprising:
    memory comprising at least first and second storage partitions, the first storage partition including encrypted data that is decrypted after a first user code is received;
    circuitry configured to authorize access to the first storage partition when the first user code is received; and
    a user interface configured to receive the first user code while the storage device is in a detached state, the user interface further configured to provide the first user code to the circuitry;
    wherein the circuitry is programmed to:
    deny access to the second storage partition when the first user code is received;
    allow access to the second storage partition and not to the first storage partition when a second user code is received;
    allow access to the first and the second storage partitions when a third user code is received; and
    reset the first, second, and third user codes when a reset code is received by the circuitry.

2. The storage device of claim 1, further comprising a communication interface configured to send a signal to a digital device coupled to the storage device, the signal indicating that the first storage partition is authorized for access.

3. The storage device of claim 1, further comprising an authorization indicator configured to indicate that access to the first storage partition is authorized when the first user code is received.

4. The storage device of claim 1, further comprising an encryptor configured to decrypt a security code to access the first storage partition based on the first user code.

5. The storage device of claim 4, wherein the encryptor is configured to decrypt the encrypted data within the first storage partition.

6. The storage device of claim 1, further comprising a controller configured to identify the detachable device to a host computer coupled thereto.

7. The storage device of claim 1, further comprising a power system operable to supply power to the circuitry while the storage device is in the detached state.

8. The storage device of claim 1, wherein the user interface is configured to receive the first user code as series of numbers, letters, symbols, or special characters.

9. The storage device of claim 1, further comprising a connector for coupling the storage device to a host through one or more of a USB connection, firewire connection, ethernet connection, serial connection, parallel connection, SCSI connection, host bus adapter, flash card interface, and an ATA connection.

10. The storage device of claim 1, wherein the memory comprises one or more of NAND flash memory, NOR flash memory, a hard drive, a storage card, an optical drive, a ram disk, and magnetic tape.

11. A method comprising:
    receiving a first user code to allow access to a storage device having at least first and second storage partitions, wherein the storage device is in a detached state when receiving the first user code;
    authorizing access to the first storage partition when the storage device is coupled to a digital device, based at least in part on the first user code;
    denying access to the second storage partition when the storage device is coupled to the digital device, based at least in part on the first user code;
    allowing access to the first and second storage partitions based on the storage device receiving a second user code;
    resetting the first and second user codes based on receiving a reset code by the storage device; and
    erasing data in the first and second storage partitions when the reset code is received by the storage device.

12. The method of claim 11, further comprising sending a signal to the digital device, the signal indicating that access is authorized to one or both of the first and second storage partitions is authorized.

13. The method of claim 11, further comprising alerting a user that access is authorized to one or both of the first and second storage partitions.

14. The method of claim 11, further comprising decrypting a security code based one or both of the first and second user codes.

15. The method of claim 11, further comprising decrypting data within one or both of the first and second storage partitions.

16. The method of claim 11, further comprising sending a signal to the digital device to recognize and mount one or both of the first and second storage partitions.

17. The method of claim 11, wherein receiving one or more of the first and second user codes comprises receiving a series of numbers, letters, symbols, or special characters.

18. The method of claim 11, further comprising supplying power to the storage device in the detached state.

19. The method of claim 11, further comprising coupling the storage device to the digital device through one or more of a USB connection, firewire connection, Ethernet connection, serial connection, parallel connection, host bus adapter connection, flash card interface connection, ATA connection, and a wireless connection between the storage device and the digital device.

20. A non-transitory computer readable medium having embodied thereon a program, the program executable by a processor for performing a method comprising:
    receiving a first user code with a portable memory device in a detached state, the portable memory device having at least first and second storage partitions;
    descrambling a database file system associated with the first and second storage partitions, utilizing the first user code;
    authorizing access to the first partition and denying access to the second partition, based on the first user code;
    receiving a second user code with the portable memory device in the detached state;

authorizing access to the second partition and denying access to the first partition, based on the second user code.

21. The non-transitory computer readable medium of claim 20, wherein the method further comprises:
   receiving a third user code with the portable memory device in the detached state; and
   authorizing access to the first and second partitions, based on the third user code.

22. The non-transitory computer readable medium of claim 21, wherein the method further comprises:
   receiving a reset code from a user of the portable memory device; and
   resetting the first, second, and third user codes, based on the reset code.

23. The non-transitory computer readable medium of claim 20, further comprising:
   encrypting data received from a digital device coupled to the portable memory device; and
   storing the encrypted data in one or both of the first and second partitions.

24. The non-transitory computer readable medium of claim 23, further comprising:
   decrypting the encrypted data stored in one or both of the first and second partitions; and
   sending a result of decrypting the encrypted data to the digital device.

\* \* \* \* \*